(12) United States Patent
Jiang et al.

(10) Patent No.: US 11,784,493 B2
(45) Date of Patent: Oct. 10, 2023

(54) METHOD AND DEVICE FOR PRIMARY FREQUENCY MODULATION IN NEW ENERGY POWER GENERATION

(71) Applicant: Sungrow Power Supply Co., Ltd., Hefei (CN)

(72) Inventors: Tao Jiang, Anhui (CN); Nianan Pan, Anhui (CN); Chao Liu, Anhui (CN); Wei Sun, Anhui (CN); Xianli Zhang, Anhui (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 127 days.

(21) Appl. No.: 17/485,033

(22) Filed: Sep. 24, 2021

(65) Prior Publication Data
US 2022/0158453 A1    May 19, 2022

(30) Foreign Application Priority Data
Nov. 13, 2020  (CN) .......................... 202011267910.8

(51) Int. Cl.
*H02J 3/38*        (2006.01)
*H02J 3/48*        (2006.01)

(52) U.S. Cl.
CPC ................ *H02J 3/381* (2013.01); *H02J 3/48* (2013.01); *H02J 2300/24* (2020.01); *H02J 2300/28* (2020.01)

(58) Field of Classification Search
CPC .......... H02J 3/381; H02J 3/48; H02J 2300/24; H02J 2300/28
USPC .......................................................... 307/43
See application file for complete search history.

(56) References Cited

U.S. PATENT DOCUMENTS

2020/0169219 A1    5/2020 Zhang et al.

FOREIGN PATENT DOCUMENTS

| CN | 108039740 A | 5/2018 |
|---|---|---|
| CN | 208174274 U | 11/2018 |
| CN | 110365030 A | 10/2019 |
| CN | 106300394 B | 3/2020 |
| CN | 110994640 A | 4/2020 |
| CN | 111555310 A | 8/2020 |
| CN | 111614122 A | 9/2020 |
| CN | 111711203 A | 9/2020 |

(Continued)

OTHER PUBLICATIONS

Extended European Search Report for European Application No. 21194670.2, dated Feb. 14, 2022.

(Continued)

*Primary Examiner* — Richard Tan
(74) *Attorney, Agent, or Firm* — Wolf, Greenfield & Sacks, P.C.

(57) ABSTRACT

A method and a device for primary frequency modulation in new energy power generation are provided. An inverter performs a first power adjustment according to a p-f droop curve before receiving a power adjustment instruction sent by the power station controller, and performs a second power adjustment in response to the power adjustment instruction. Since the inverter performs the first power adjustment before responding to the power adjustment instruction sent by the power station controller, the response of the primary frequency modulation is speeded up, so that rapid control for the new energy generation power is achieved, thereby ensuring stable operation of a power grid for new energy power generation.

12 Claims, 4 Drawing Sheets

(56) References Cited

FOREIGN PATENT DOCUMENTS

WO    WO 2015/028840 A1    3/2015
WO    WO 2016/172283 A1    10/2016

OTHER PUBLICATIONS

First Office Action for Chinese Application No. 202011267910.8, dated Aug. 10, 2022.

METHOD AND DEVICE FOR PRIMARY FREQUENCY MODULATION IN NEW ENERGY POWER GENERATION

The present application claims priority to Chinese Patent Application No. 202011267910.8, titled "METHOD AND DEVICE FOR PRIMARY FREQUENCY MODULATION IN NEW ENERGY POWER GENERATION", filed on Nov. 13, 2020 with the China National Intellectual Property Administration, which is incorporated herein by reference in its entirety.

FIELD

The present disclosure relates to the technical field of new energy power generation, and in particular to a method and a device for primary frequency modulation in new energy power generation.

BACKGROUND

With rapid development of new energy power generation, a volume of a new energy power station is increasingly large. A power grid faces great challenges due to large-scale parallel operations of generators in new energy power generation. In order to ensure stable operation of the power grid, power control for the power grid is required.

At present, in a process of power control based on primary frequency modulation, a power coordinated control system calculates target power, generates a power adjustment instruction for each inverter based on the target power, and sends the power adjustment instruction to the inverter for power adjustment. However, a response of the primary frequency modulation is slow due to a communication delay between the power coordinated control system and the inverter. As a result, power control for new energy generation cannot be performed rapidly.

SUMMARY

In view of this, a method and a device for primary frequency modulation in new energy power generation are provided according to the present disclosure, so that an inverter starts power adjustment before executing a power regulation instruction sent by a power station controller, so as to speed up a response of the primary frequency modulation.

The following technical solutions are provided according to the present disclosure.

A method for primary frequency modulation in new energy power generation is provided. The method is performed by an inverter. The method includes: performing a first power adjustment based on a power-frequency (p-f) droop curve; receiving a power adjustment instruction sent by a power station controller, and performing a second power adjustment in response to the power adjustment instruction; and ending the first power adjustment when a preset power adjustment end condition is met.

In an embodiment, the performing a first power adjustment based on a p-f droop curve includes performing the first power adjustment based on the p-f droop curve when detecting that a change in a frequency on an alternating current side of the inverter is greater than a first threshold.

In an embodiment, the power adjustment instruction is generated by the power station controller based on a change in active power and the number of the inverter. The change in the active power is calculated by the power station controller when detecting that a change in a frequency of a grid connection point is greater than a second threshold. The first threshold is not greater than the second threshold.

In an embodiment, the performing the first power adjustment based on the p-f droop curve includes: determining, based on the p-f droop curve, a change in power corresponding to the change in the frequency on the alternating current side of the inverter; and calculating a sum of active power carried in the power adjustment instruction sent by the power station controller and the change in power, as target active power, to perform the first power adjustment.

In an embodiment, the method further comprises: timing the first power adjustment from a time instant when starting the first power adjustment. The ending the first power adjustment when a preset power adjustment end condition is met includes: determining that the preset power adjustment end condition is met and ending the first power adjustment when detecting that timed duration of the first power adjustment reaches a preset time period. The preset time period is longer than a time period from the time instant when starting the first power adjustment to a time instant when the power adjustment instruction sent by the power station controller is received.

In an embodiment, the ending the first power adjustment when a preset power adjustment end condition is met includes: determining whether a change in the power corresponding to a current change in the frequency on the alternating current side of the inverter is zero; determining that the preset power adjustment end condition is met and ending the first power adjustment when determining that the change in the power is zero.

In an embodiment, the performing a second power adjustment in response to the power adjustment instruction includes: determining active power in the power adjustment instruction when ending the first power adjustment; and performing the second power adjustment based on the active power.

A device for primary frequency modulation in new energy power generation is provided. The device is applicable to an inverter. The device includes a power adjustment unit, an adjustment instruction response unit, and a power adjustment. The power adjustment unit is configured to perform a first power adjustment based on a p-f) droop curve. The adjustment instruction response unit is configured to: receive a power adjustment instruction sent by a power station controller, and perform a second power adjustment in response to the power adjustment instruction. The power adjustment end control unit is configured to end the first power adjustment when a preset power adjustment end condition is met.

In an embodiment, the power adjustment unit is configured to perform the first power adjustment based on the p-f droop curve when it is detected that a change in a frequency on an alternating current side of the inverter is greater than a first threshold.

In an embodiment, the power adjustment instruction is generated by the power station controller based on a change in active power and the number of the inverter. The change in the active power is calculated by the power station controller when detecting that a change in a frequency of a grid connection point is greater than a second threshold. The first threshold is not greater than the second threshold.

In an embodiment, the power adjustment unit is configured to: determine, based on the p-f droop curve, a change in power corresponding to the change in the frequency on the alternating current side of the inverter; and calculate a sum of active power carried in the power adjustment instruction sent by the power station controller and the change in power, as target active power, to perform the first power adjustment.

In an embodiment, the device further includes a timing unit. The timing unit is configured to time the first power adjustment from a time instant when the first power adjustment starts. The power adjustment end control unit is configured to: determine that the preset power adjustment end condition is met and end the first power adjustment when it is detected that time duration of the first power adjustment reaches a preset time period. The preset time period is longer than a time period from the time instant when the first power adjustment is started to a time instant when the power adjustment instruction sent by the power station controller is received.

In an embodiment, the power adjustment end control unit is configured to: determine whether a change in the power corresponding to a current change in the frequency on the alternating current side of the inverter is zero; and determine that the preset power adjustment end condition is met and end the first power adjustment when the change in the power is determined as zero.

In an embodiment, the adjustment instruction response unit is configured to: determine active power in the power adjustment instruction when the first power adjustment ends; and perform the second power adjustment based on the active power.

Compared with the existing solutions, beneficial effects of the technical solutions according to the present disclosure are as follows.

A method for primary frequency modulation in new energy power generation is provided. In the method, the inverter performs a first power adjustment according to the p-f droop curve before receiving a power adjustment instruction sent by the power station controller, and performs a second power adjustment in response to the power adjustment instruction. Since the inverter performs the first power adjustment before responding to the power adjustment instruction sent by the power station controller, the response of the primary frequency modulation is speeded up, so that rapid control for the new energy generation power is achieved, thereby ensuring stable operation of a power grid for new energy power generation.

BRIEF DESCRIPTION OF THE DRAWINGS

For clear illustrations of technical solutions in embodiments of the present disclosure or in the existing solutions, the drawings to be used in the description of the embodiments or the existing solutions are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

The technical solutions in the embodiments of the present disclosure are described clearly and completely in conjunction with the drawings in the embodiments of the present disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

A method for primary frequency modulation in new energy power generation is provided according to the present disclosure. The new energy power generation herein refers to wind power generation or photovoltaic power generation. The method is performed by the inverter, so that the inverter starts a first power adjustment before executing a power regulation instruction sent by a power station controller, thereby speeding up a response of the primary frequency modulation.

Figure 1:
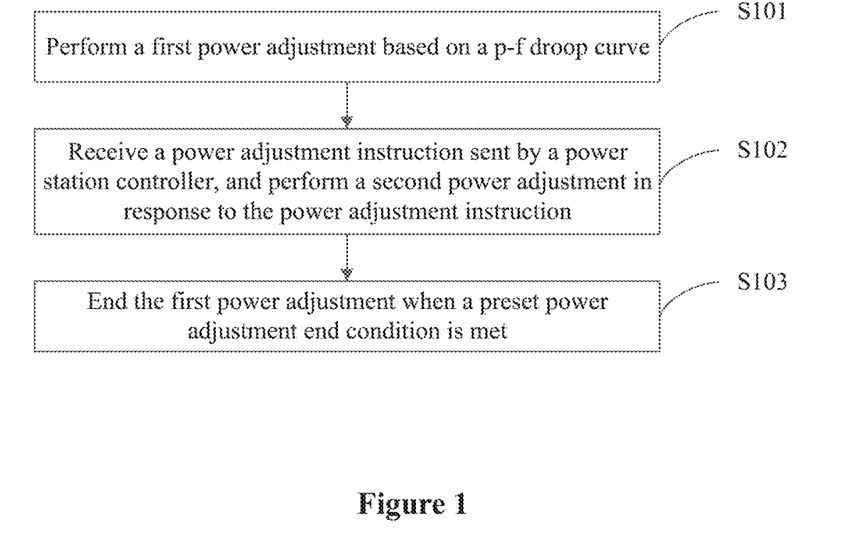
FIG. 1 is a schematic flowchart of a method for primary frequency modulation in new energy power generation according to an embodiment of the present disclosure.

Referring to FIG. 1, the method includes the following steps S101 to S103.

In step S101, the inverter performs a first power adjustment based on a power-frequency (p-f) droop curve.

The inverter is capable of directly responding to a change in its own power based on the p-f droop curve. Therefore, the inverter is capable of directly responding to a change in a frequency of a power grid, so as to quickly adjust the frequency of the power grid.

In step S102, the inverter receives a power adjustment instruction sent by a power station controller, and performs a second power adjustment in response to the power adjustment instruction.

In step S103, the inverter ends the first power adjustment when a preset power adjustment end condition is met.

It should be noted that the inverter performs the first power adjustment based on the p-f droop curve before receiving the power adjustment instruction sent by the power station controller, and performs the second power adjustment by executing the power adjustment instruction. That is, the inverter and the power station controller cooperate to finish primary frequency adjustment for a power station rapidly and accurately. When the preset power adjustment end condition is met, the inverter stops performing the first power adjustment and still performs the second power adjustment, to finish the primary frequency modulation, thereby achieving centralized response of the power station. With this method, the inverter performs two sequential power adjustments for the primary frequency modulation, whereby the primary frequency modulation is performed rapidly and accurately.

Specifically, the inverter performs the first power adjustment when detecting that a change in a frequency on an alternating current side of the inverter is greater than a first threshold. The power station controller sends the power adjustment instruction to the inverter when detecting that a change in the frequency of a grid connection point is greater than a second threshold. The first threshold is not greater than the second threshold, so that the inverter performs the first power adjustment before executing the power adjustment instruction sent by the power station controller.

Figure 2:
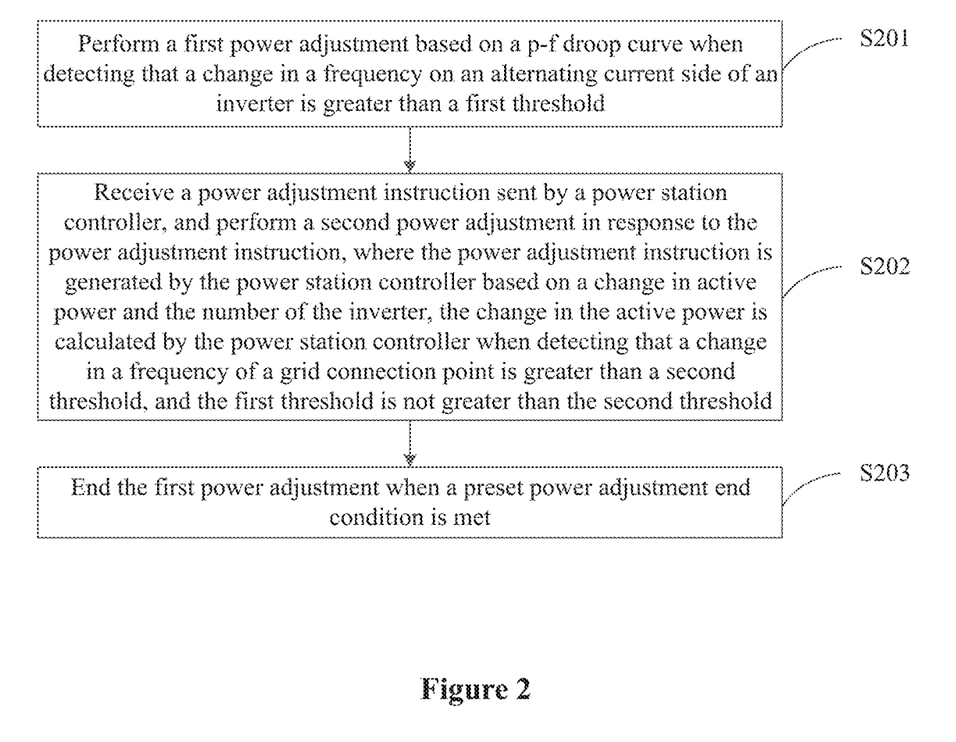
FIG. 2 is a schematic flowchart of a method for primary frequency modulation in new energy power generation according to another embodiment of the present disclosure.

Based on the above, referring to FIG. 2, the method for primary frequency modulation in new energy power generation according to another embodiment includes the following steps S201 to S203.

In step S201, when detecting that a change in the frequency on the alternating current side of the inverter is greater than the first threshold, the inverter performs the first power adjustment based on the p-f droop curve.

The inverter acquires the frequency on the alternating current side of the inverter in real time. The change in the frequency on the alternating current side of the inverter is a difference between a currently acquired frequency on the alternating current side of the inverter and a reference frequency on the alternating current side of the inverter. When the change in the frequency on the alternating current side of the inverter is greater than the first threshold, the inverter starts performing the first power adjustment.

Figure 3:
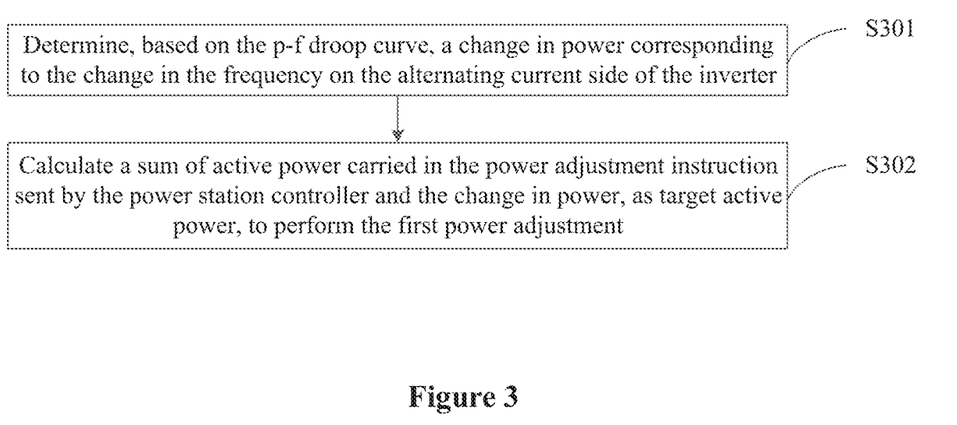
FIG. 3 is a schematic flowchart of a first power adjustment according to an embodiment of the present disclosure.

Referring to FIG. 3, the first power adjustment includes the following steps S301 to S302.

In step S301, the inverter determines, based on the p-f droop curve, a change in power corresponding to the change in the frequency on the alternating current side of the inverter.

Figure 4:
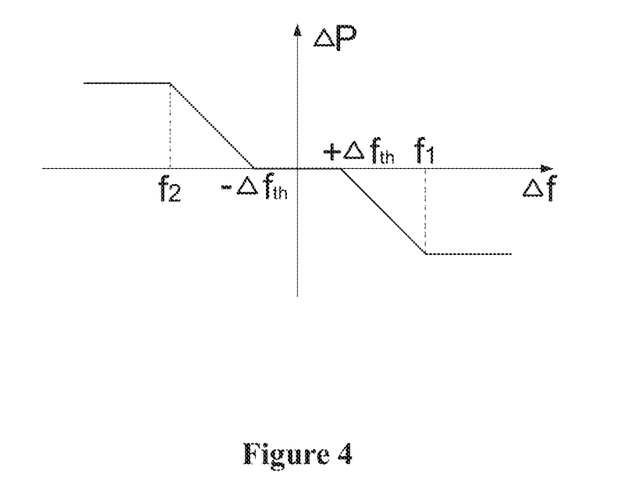
FIG. 4 is a schematic diagram showing a power-frequency (p-f) droop curve according to an embodiment of the present disclosure.

FIG. 4 shows the p-f droop curve, where $\Delta f$ represents a change in the frequency, $\Delta P$ represents a change in the power, and $\Delta fth$ is the first threshold.

The change $\Delta P$ in the power is calculated from $\Delta P = k*(\Delta f - \Delta fth)$, where k is a coefficient of the p-f droop curve.

The change $\Delta P$ in the power is positive or negative. A change $\Delta f$ greater than $+\Delta fth$, for example, a change $f_1$ as shown in FIG. 3, corresponds to a negative change $\Delta P$. In this case, it is required to reduce the power to lower the frequency. A change $\Delta f$ less than $-\Delta fth$, for example, a change $f_2$ as shown in FIG. 3, corresponds to a positive change $\Delta P$. In this case, it is required to increase the power.

In step S302, a sum of active power carried in the power adjustment instruction currently sent by the power station controller and the change in power is calculated as target active power, to perform the first power adjustment.

The target active power P is calculated form $P = P_{PPC} + \Delta P$.

$P_{PPC}$ represents active power carried in a power adjustment instruction currently sent by the power station controller. It should be noted that, since the first threshold is not greater than the second threshold, the inverter performs the first power adjustment before receiving the power adjustment instruction sent by the power station controller. In a case that the inverter does not receive a current power adjustment instruction from the power station controller, $P_{PPC}$ represents an active power carried in a previous power adjustment instruction sent by the power station controller. That is, $P_{PPC}$ represents an active power carried in a latest power adjustment instruction received by the inverter.

In step S202, the inverter receives a power adjustment instruction sent by the power station controller and performs the second power adjustment in response to the power adjustment instruction. When detecting that the change in the frequency of the grid connection point is greater than the second threshold, the power station controller calculates a change in active power, and generates the power adjustment instruction based on the number of the inverter and the change in active power. The first threshold is not greater than the second threshold.

Details for the power station controller calculating a change in active power, and generating the power adjustment instruction based on the number of the inverter and the change in active power are known in the art, and therefore are not described herein.

The inverter performs the second power adjustment in response to the power adjustment instruction. Specifically, the inverter determines the active power corresponding to the power adjustment instruction, and performs the second power adjustment based on the active power.

Since the first threshold is not greater than the second threshold, the inverter starts performing the first power adjustment before the power station controller sends the power adjustment instruction, or the inverter starts performing the first power adjustment at the same time as the power station controller sends the power adjustment instruction. There is no communication time delay between a time instant when the inverter determines to perform the first power adjustment and a time instant when the inverter starts the first power adjustment, so that the inverter performs the first power adjustment before executing the power adjustment instruction sent by the power station controller, thereby speeding up a response of the primary frequency modulation.

In step S203, the inverter ends the first power adjustment when the preset power adjustment end condition is met.

For a stable transition from the first power adjustment to the second power adjustment, the inverter starts the second power adjustment to the power adjustment instruction before ending the first power adjustment, achieving smooth switching from the first power adjustment to the second power adjustment.

In order to achieve the stable transition from the first power adjustment to the second power adjustment, the first power adjustment is timed from a time instant when the inverter starts the first power adjustment. The preset power adjustment end condition is set as duration of the first power adjustment reaching a preset time period. The preset time period is longer than a time period from the time instant when the inverter starts the first power adjustment to a time instant when the inverter receives the power adjustment instruction sent by the power station controller.

Figure 5:
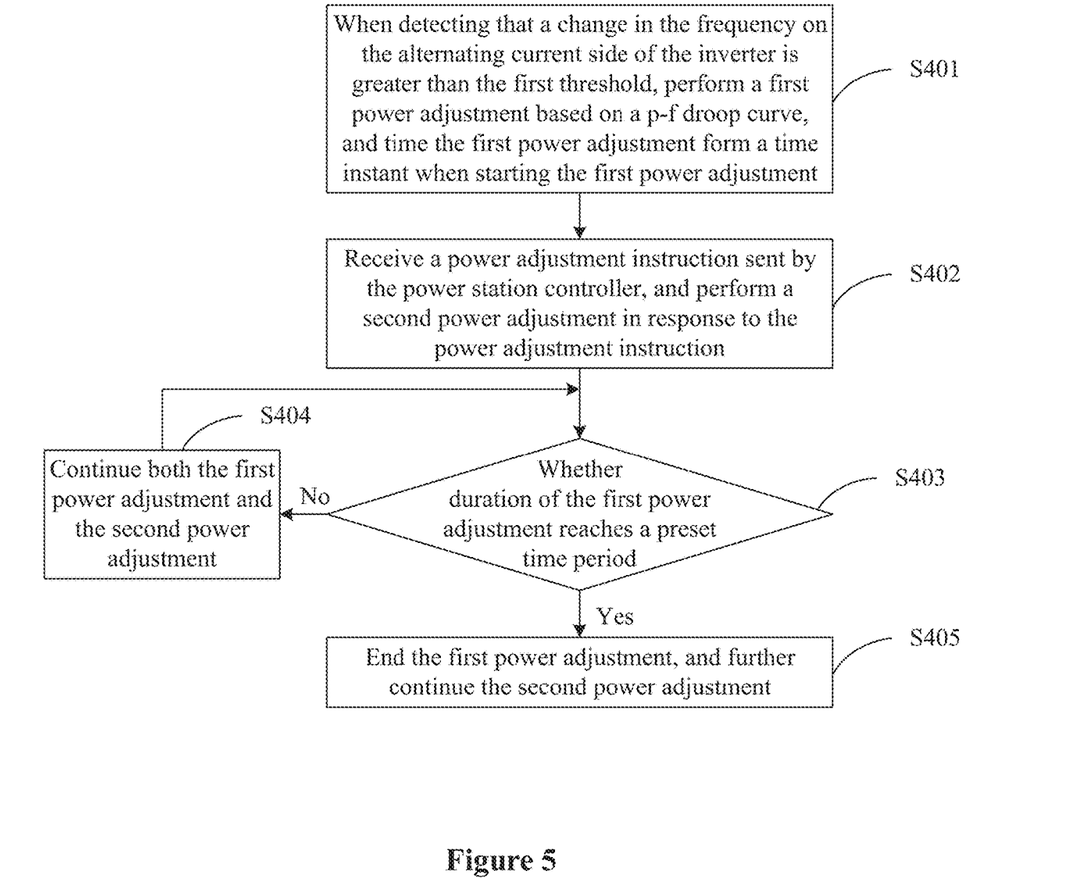
FIG. 5 is a schematic flowchart of a method for primary frequency modulation in new energy power generation according to another embodiment of the present disclosure.

Based on the above, referring to FIG. 5, the method for primary frequency modulation in new energy power generation according to another embodiment includes the following steps S401 to S405.

In step S401, when detecting that a change in the frequency on the alternating current side of the inverter is greater than the first threshold, a first power adjustment is performed based on the p-f droop curve, and the first power adjustment is timed form a time instant when starting the first power adjustment.

In step S402, a power adjustment instruction sent by the power station controller is received, and a second power adjustment is performed in response to the power adjustment instruction.

In step S403, it is determined whether duration of the first power adjustment reaches a preset time period. If the duration of the first power adjustment does not reach the preset time period, step S404 is performed. If the duration of the first power adjustment reaches the preset time period, step S405 is performed.

In step S404, both the first power adjustment and the second power adjustment continue.

In this step, target active power P based on which both the first power adjustment and the second power adjustment are performed is calculated from $P = P_{PPC} + \Delta P$, where $\Delta P$ represents a change in the power, and the first power adjustment is performed based on the change in the power. $P_{PPC}$ represents active power carried in the power adjustment instruction.

In step S405, the first power adjustment ends, and the second power adjustment continues.

In this step, target active power P based on which the second power adjustment is performed is calculated from $P=P_{PPC}$.

Further, ΔP stars approaching 0 when the duration of the first power adjustment reaches the preset time period, until ΔP=0, thereby achieving smooth switching from the first power adjustment to the second power adjustment.

The inverter performs only the second power adjustment in response to the power adjustment instruction until the power station controller detects that change in a frequency of the grid connection point is not less than the second threshold, so as to finish the primary frequency modulation.

Further, for simplifying the first power adjustment, a current active power for the first power adjustment is not updated during the first power adjustment. When the first power adjustment ends, active power in the power adjustment instruction serves as the current active power.

Alternatively, when ending the first power adjustment, the current active power is adjusted (increased or decreased) slowly, thereby achieving smooth switching from the first power adjustment to the second power adjustment.

The method for primary frequency modulation in new energy power generation according to the above embodiments is applicable to wind power generation or photovoltaic power generation. It should be noted that when a photovoltaic power station generates power based on massively parallel processing (MPP), the active power is only increased or only decreased. In a case of limited power, the active power is both increased and decreased. An energy storage power station or optical storage power station is capable of performing the whole method, that is, adjust the active power upwards or downwards within a configured capacity range.

Figure 6:
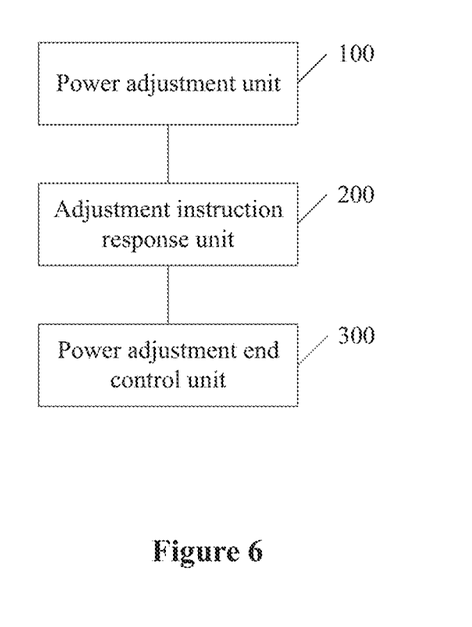
FIG. 6 is a schematic structural diagram of a device for primary frequency modulation in new energy power generation according to an embodiment of the present disclosure.

Based on the method for primary frequency modulation in new energy power generation according to the above embodiments, a device for primary frequency modulation in new energy power generation is provided according to an embodiment of the present disclosure. The device is applicable to an inverter. Referring to FIG. 6, the device includes a power adjustment unit 100, an adjustment instruction response unit 200, and a power adjustment end control unit 300.

The power adjustment unit 100 is configured to perform a first power adjustment based on a p-f droop curve.

The adjustment instruction response unit 200 is configured to receive a power adjustment instruction sent by a power station controller, and perform a second power adjustment in response to the power adjustment instruction.

The power adjustment end control unit 300 is configured to end the first power adjustment when a preset power adjustment end condition is met.

In an embodiment, the power adjustment unit 100 is configured to perform the first power adjustment based on the p-f droop curve when it is detected that a change in a frequency on an alternating current side of the inverter is greater than a first threshold.

When detecting that a change in a frequency of a grid connection point is greater than a second threshold, the power station controller calculates a change in active power, and generates the power adjustment instruction based on the number of the inverter and the change in active power. The first threshold is not greater than the second threshold.

In an embodiment, the power adjustment unit 100 is configured to: determine, based on the p-f droop curve, a change in power corresponding to a change in frequency on the alternating current side of the inverter; and calculate a sum of active power carried in the power adjustment instruction sent by the power station controller and the change in power, as target active power, to perform the first power adjustment.

In an embodiment, the device further includes a timing unit. The timing unit is configured to time the first power adjustment from a time instant when the first power adjustment starts.

In an embodiment, the power adjustment end control unit 300 is configured to: determine that the preset power adjustment end condition is met and end the first power adjustment when it is detected that duration of the first power adjustment reaches a preset time period. The preset time period is longer than a time period from the time instant when the first power adjustment starts to a time instant when the power adjustment instruction sent by the power station controller is received.

In an embodiment, the power adjustment end control unit 300 is configured to: determine whether a change in the power corresponding to a current change in the frequency on the alternating current side of the inverter is zero; and determine that the preset power adjustment end condition is met and end the first power adjustment when determining that the change in the power is zero.

In an embodiment, the adjustment instruction response unit 200 is configured to: determine active power in the power adjustment instruction when the first power adjustment ends; and perform the second power adjustment based on the active power.

With the device for primary frequency modulation in new energy power generation according to the embodiment of the present disclosure, the inverter performs the first power adjustment based on the p-f droop curve, receives the power adjustment instruction sent by the power station controller, and performs the second power adjustment in response to the power adjustment instruction. That is, the inverter performs the first power adjustment before receiving the power adjustment instruction sent by the power station controller. Therefore, the response of the primary frequency modulation is speeded up, so that rapid control for the new energy generation power is achieved, thereby ensuring stable operation of a power grid for new energy power generation.

Specifically, the inverter performs the first power adjustment when detecting that the change in the frequency on an alternating current side of the inverter is greater than the first threshold. The power station controller sends the power adjustment instruction to the inverter when detecting that the change in the frequency of a grid connection point is greater than the second threshold. The first threshold is not greater than the second threshold, so that the inverter performs the first power adjustment before executing the power adjustment instruction sent by the power station controller.

The embodiments in this specification are described in a progressive manner, Each embodiment focuses on differences from other embodiments. The same and similar parts between embodiments are referred to each other. Since the device corresponds to the method, the description, the description of the device is relatively simple. Details of the device can be referred to the description of the method.

It should further be noted that relational terms such as first and second are only for distinguishing one entity or operation from another, rather than necessarily requiring or implying any such relationship or order between entities or operations. Moreover, terms "include", "comprise" or any other variants thereof are intended to be non-exclusive, so that a process, method, article or device including a series of elements includes not only those elements listed herein but also other elements that are not listed, or further includes an element inherent to the process, method, article, or device, Unless expressively limited otherwise, the statement "comprising (including) one . . . " does not exclude a case that the process, method, article or device further includes other similar elements.

The steps of the method or algorithm described herein may be directly implemented by hardware, a software module executed by a processor, or a combination of hardware and a software module executed by a processor. The software module may be arranged in any storage medium known in the technical field, such as a random access memory (RAM), a memory, a read only memory (ROM), an electrically programmable ROM, an electrically erasable programmable ROM, a register, a hard disk, a removable disk, and a compact disc read-only memory (CD-ROM).

The above embodiments may be combined with each other. For the above description of the disclosed embodiments, features described in the embodiments in this specification may be replaced or combined with each other, so that those skilled in the art can implement or use the present disclosure.

Based on the above description of the disclosed embodiments, those skilled in the art can implement or carry out the present disclosure. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A method for primary frequency control in renewable energy power generation, wherein the method is performed by an inverter, and the method comprises:
   performing a first power adjustment based on a power-frequency (p-f) droop curve;
   receiving a power adjustment instruction sent by a power station controller, and performing a second power adjustment in response to the power adjustment instruction; and
   ending the first power adjustment when a preset power adjustment end condition is met, wherein the method further comprises:
   timing the first power adjustment from a time instant when starting the first power adjustment, wherein
   the ending the first power adjustment when the preset power adjustment end condition is met comprises:
      determining that the preset power adjustment end condition is met and ending the first power adjustment when detecting that timed duration of the first power adjustment reaches a preset time period, wherein the preset time period is longer than a time period from the time instant when starting the first power adjustment to a time instant when the power adjustment instruction sent by the power station controller is received.

2. The method according to claim 1, wherein the performing the first power adjustment based on the p-f droop curve comprises:
   performing the first power adjustment based on the p-f droop curve when detecting that a change in a frequency on an alternating current side of the inverter is greater than a first threshold.

3. The method according to claim 2, wherein the power adjustment instruction is generated by the power station controller based on a change in active power and the number of the inverter, wherein the change in the active power is calculated by the power station controller when detecting that a change in a frequency of a grid connection point is greater than a second threshold, and the first threshold is not greater than the second threshold.

4. The method according to claim 2, wherein the performing the first power adjustment based on the p-f droop curve comprises:
   determining, based on the p-f droop curve, a change in power corresponding to the change in the frequency on the alternating current side of the inverter; and
   calculating a sum of active power carried in the power adjustment instruction sent by the power station controller and the change in power, as target active power, to perform the first power adjustment.

5. The method according to claim 4, wherein the ending the first power adjustment when the preset power adjustment end condition is met comprises:
   determining whether a change in the power corresponding to a change in the frequency on the alternating current side of the inverter is zero, wherein the change in the frequency on the alternating current side of the inverter is a difference between a currently acquired frequency on the alternating current side of the inverter and a reference frequency on the alternating current side of the inverter; and
   determining that the preset power adjustment end condition is met and ending the first power adjustment when determining that the change in the power is zero.

6. The method according to claim 1, wherein the performing a second power adjustment in response to the power adjustment instruction comprises:
   determining active power in the power adjustment instruction when ending the first power adjustment; and
   performing the second power adjustment based on the active power.

7. A device for primary frequency control in renewable energy power generation, wherein the device is applicable to an inverter, and the device comprises:
   a power adjustment unit configured to perform a first power adjustment based on a power-frequency (p-f) droop curve;
   an adjustment instruction response unit configured to: receive a power adjustment instruction sent by a power station controller, and perform a second power adjustment in response to the power adjustment instruction; and
   a power adjustment end control unit configured to end the first power adjustment when a preset power adjustment end condition is met, wherein the device further comprises:
   a timing unit configured to time the first power adjustment from a time instant when the first power adjustment starts, wherein the power adjustment end control unit is configured to: determine that the preset power adjustment end condition is met and end the first power adjustment when it is detected that timed duration of the first power adjustment reaches a preset time period, wherein the preset time period is longer than a time period from the time instant when the first power adjustment is started to a time instant when the power adjustment instruction sent by the power station controller is received.

8. The device according to claim 7, wherein the power adjustment unit is configured to perform the first power adjustment based on the p-f droop curve when it is detected that a change in a frequency on an alternating current side of the inverter is greater than a first threshold.

9. The device according to claim 8, wherein the power adjustment instruction is generated by the power station controller based on a change in active power and the number of the inverter, wherein the change in the active power is calculated by the power station controller when detecting that a change in a frequency of a grid connection point is greater than a second threshold, and the first threshold is not greater than the second threshold.

10. The device according to claim 8, wherein the power adjustment unit is configured to:
   determine, based on the p-f droop curve, a change in power corresponding to the change in the frequency on the alternating current side of the inverter; and
   calculate a sum of active power carried in the power adjustment instruction sent by the power station controller and the change in power, as target active power, to perform the first power adjustment.

11. The device according to claim 8, wherein the power adjustment end control unit is configured to:
   determine whether a change in the power corresponding to a change in the frequency on the alternating current side of the inverter is zero, wherein the change in the frequency on the alternating current side of the inverter is a difference between a currently acquired frequency on the alternating current side of the inverter and a reference frequency on the alternating current side of the inverter; and
   determine that the preset power adjustment end condition is met and end the first power adjustment when the change in the power is determined as zero.

12. The device according to claim 7, wherein the adjustment instruction response unit is configured to:
   determine active power in the power adjustment instruction when the first power adjustment ends; and
   perform the second power adjustment based on the active power.

\* \* \* \* \*